United States Patent
Huang

(10) Patent No.: US 8,423,813 B2
(45) Date of Patent: Apr. 16, 2013

(54) MEMORY CONTROLLER AND DEVICE WITH DATA STROBE CALIBRATION

(75) Inventor: Hsiang-I Huang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 682 days.

(21) Appl. No.: 12/711,410

(22) Filed: Feb. 24, 2010

(65) Prior Publication Data

US 2010/0153766 A1 Jun. 17, 2010

Related U.S. Application Data

(63) Continuation of application No. 11/385,501, filed on Mar. 21, 2006, now Pat. No. 7,698,589.

(51) Int. Cl.
*G06F 1/12* (2006.01)

(52) U.S. Cl.
USPC .......................................... 713/401; 400/503

(58) Field of Classification Search ................... 713/400, 713/401, 503
See application file for complete search history.

(56) References Cited

U.S. PATENT DOCUMENTS

| 6,760,856 | B1 | 7/2004 | Borkenhagen |
| 7,065,666 | B2 * | 6/2006 | Janzen ......................... 713/400 |
| 7,123,051 | B1 | 10/2006 | Lee |
| 7,369,455 | B2 | 5/2008 | Nam |
| 2005/0265437 | A1 | 12/2005 | Yeung et al. |
| 2006/0140045 | A1 | 6/2006 | Kishimoto et al. |

\* cited by examiner

*Primary Examiner* — Paul Yanchus, III
*Assistant Examiner* — Zahid Choudhury
(74) *Attorney, Agent, or Firm* — McClure, Qualey & Rodack, LLP

(57) ABSTRACT

A memory controller comprises a DQ path, a DQS path, a delay element, a flip flop, and an adjustment unit. The DQ path receives and passes a data signal, and outputs a delayed data signal. The DQS path receives and passes a data strobe signal. The delay element is coupled to the DQS path, receiving the data strobe signal to generate a compensated data strobe signal having a calibrated latency. The calibrated latency is determined by an adjustment signal. The flip flop is coupled to the data signal path and the delay element, sampling the delayed data signal by the compensated data strobe signal to generate an output data. The adjustment unit generates the adjustment signal according to the output data. The adjustment unit performs a calibration to adjust the adjustment signal, thus the calibrated latency is adjusted.

9 Claims, 9 Drawing Sheets

MEMORY CONTROLLER AND DEVICE WITH DATA STROBE CALIBRATION

CROSS REFERENCE TO RELATED APPLICATIONS

This application is a Continuation of pending U.S. patent application Ser. No. 11/385,501, filed Mar. 21, 2006, the entirety of which is incorporated by reference herein.

BACKGROUND OF THE INVENTION

1. Field of the Invention

The invention relates to double data rate (DDR) memory, and in particular, to a calibration method for data strobe skew compensation in a DDR memory controller.

2. Description of the Related Art

FIG. 1 shows a conventional memory controller transmitting data utilizing data signal DQ and data strobe signal DQS. A command generator 112 delivers a read command to a memory device (not shown), and the memory device responds data signal DQ and a data strobe signal DQS to the memory controller 102. In the memory controller 102, the data signal DQ and data strobe signal DQS are passed individually through the DQ path 104 and DQS path 106. The DQ path 104 and DQS path 106 are simplified diagrams to represent circuits in the memory controller 102, such as metal, buffers and pads which induce signal latency when passing the data signal DQ and DQS, thus, delayed data signal DQX and compensated data strobe signal DQSX are generated therefrom. Conventionally, data strobe signal DQS is edge-aligned for reading, and center-aligned for writing. Since the DQ path 104 and DQS path 106 induce variable latencies when reading, a delay element 108 is provided to compensate for the latency of compensated data strobe signal DQSX, subsequently aligning the rising edge of the compensated data strobe signal DQSX to the center of delayed data signal DQX. The delay element 108 is controlled by a delay calibration circuit 114 based on a chip internal clock #CLK. The delayed data signal DQX and compensated data strobe signal DQSX are then input to a flip flop 110, and the delayed data signal DQX is sampled by the compensated data strobe signal DQSX to generate output data.

FIG. 2a is a timing chart of transmission latency induced in a memory controller. A rising/falling edge of a data signal DQ consumes a setup time $t_S$, and the voltage level maintains for a hold time $t_H$. The valid data are available for sampling only during the hold time $t_H$. The delayed data signal DQX, having a latency X, is generated from the data signal DQ. The compensated data strobe signal DQSX is generated from the data strobe signal DQS, having a latency Y longer than the latency X, subsequently aligning the rising edge of the compensated data strobe signal DQSX to the center of the holding state of the delayed data signal DQX. The latency Y is adjusted by the delay element 108 under control of the delay calibration circuit 114. Conventionally, the difference between the compensated data strobe signal DQSX and delayed data signal DQX is ¼ cycle time. By aligning the rising edge of compensated data strobe signal DQSX to the center of the delayed data signal DQX, the delayed data signal DQX can be sampled correctly to obtain expected data. The delay calibration circuit 114 compensates latency differences between the output of DQS path 106 and DQ path 104, however, the latencies varies with temperature, circuit mismatch, and wire length, thus, accurate compensation is difficult to achieve, and an effective calibration mechanism to maintain the difference at ¼ cycle time is desirable.

FIG. 2b is a timing chart of a conventional auto refresh cycle. In FIG. 2b, a refresh command #AR is issued to make a memory device (not shown) perform an auto refresh operation occupying a plurality of clock cycles $t_{RFC}$. During the auto refresh cycle, data strobe signal DQS and data signal DQ are don't care signals, and signals on the command line are null commands NOP. Therefore no data is transmitted by the data signal DQ and data strobe signal DQS during the auto refresh cycle, and this idleness may be wasteful.

BRIEF SUMMARY OF THE INVENTION

An exemplary embodiment of a memory controller comprises a DQ path, a DQS path, a delay element, a flip flop, and an adjustment unit. The DQ path receives and passes a data signal, and outputs a delayed data signal. The DQS path receives and passes a data strobe signal. The delay element is coupled to the DQS path, receiving the data strobe signal to generate a compensated data strobe signal having a calibrated latency. The calibrated latency is determined by an adjustment signal. The flip flop is coupled to the data signal path and the delay element, sampling the delayed data signal by the compensated data strobe signal to generate an output data. The adjustment unit generates the adjustment signal according to the output data. The adjustment unit performs a calibration to adjust the adjustment signal, thus, the calibrated latency is adjusted.

Another embodiment of the invention provides a memory device, comprising a command decoder, an or-gate, a memory array, a DQS driver, a multiplexer and a DQ driver. The command decoder receives a read command or a refresh command. The or-gate, coupled to the command decoder, enables a calibration mode when the refresh command is received. The memory array stores a calibration pattern. The DQS driver, coupled to the or-gate, generates a data strobe signal when the calibration mode is enabled. The multiplexer is coupled to the memory array, outputs the calibration pattern from the memory array when the calibration mode is enabled. The DQ driver is coupled to the multiplexer and the or-gate, generating a calibration pattern as a data signal when the calibration mode is enabled.

A further embodiment provides a data strobe calibration method, compensating data skew between a data signal and a data strobe signal. A data signal comprising a calibration pattern, is provided. A maximum value and a minimum value are assigned, allowing the data strobe signal to correctly sample the data signal. The data strobe signal for sampling the data signal, is delayed with the maximum value plus an offset. If the data signal is sampled correctly, the maximum value is updated by adding the offset. The data strobe signal is delayed by the minimum value minus an offset, and if the data signal is correctly sampled, the minimum value is updated by subtracting the offset. A calibrated latency is generated based on the maximum and minimum values. The data strobe signal is delayed by the calibrated latency to sample the data signal in normal operation.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 3:
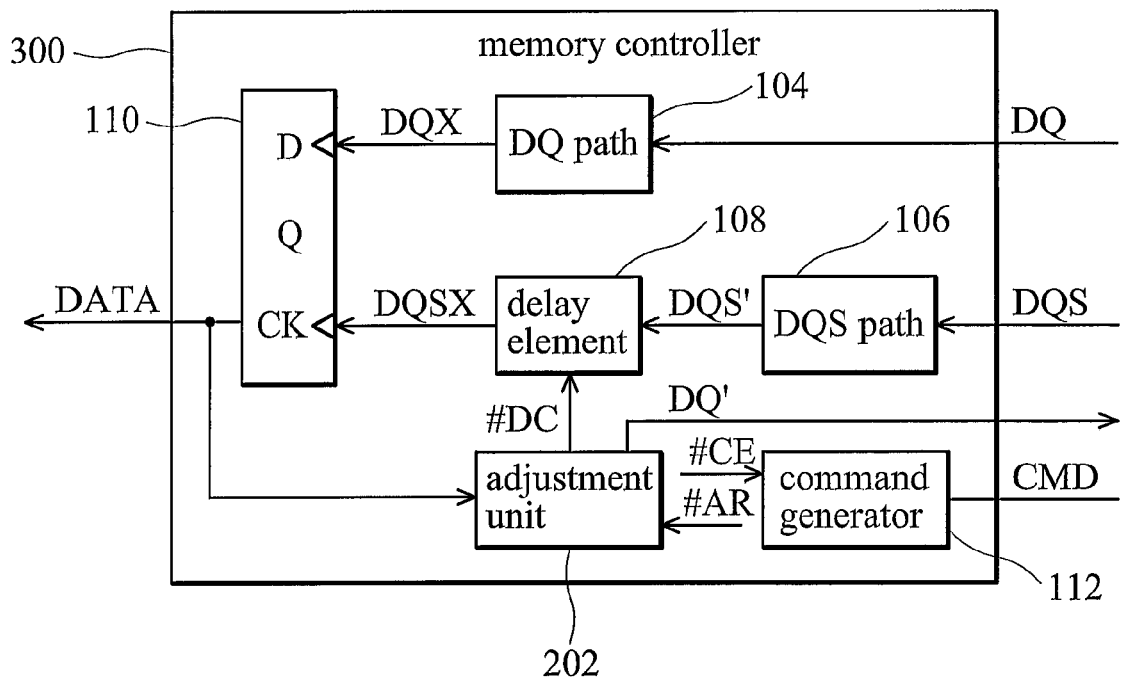
FIG. 3 shows an embodiment of a memory controller.

FIG. 3 shows an embodiment of a memory controller. The memory controller comprises a DQ path 104, a DQS path 106, a delay element 108, a flip flop 110, and an adjustment unit 202. The DQ path 104 receives and passes a data signal DQ to generate a delayed data signal DQX. The DQS path 106 receives and passes a data strobe signal DQS to generate a delayed output DQS'. The DQ path 104 and DQS path 106 are simplified diagrams of internal circuits of the memory controller 300, each comprising individual pads, metal and buffers inducing various signal latencies. Therefore the delayed output DQS' and delayed data signal DQX are delayed with different latencies and the difference is referred to as a skew. The adjustment unit 202 is a novel unit performing calibration and skew compensation based on the output from the flip flop 110. The delay element 108 coupled to the DQS path 106, receives the delayed output DQS' to generate a compensated data strobe signal DQSX having a predetermined latency different to the delayed data signal DQX by ¼ cycle time. The delay element 108 is controlled by the adjustment unit 202 via an adjustment signal #DC. The flip flop 110 coupled to the DQ path 104 and delay element 108, samples the delayed data signal DQX by the compensated data strobe signal DQSX to generate an output data. When in calibration mode, the adjustment unit 202 receives the output data from the flip flop 110 and performs calibration accordingly to adjust the delay factor in the delay element 108.

Figure 1:
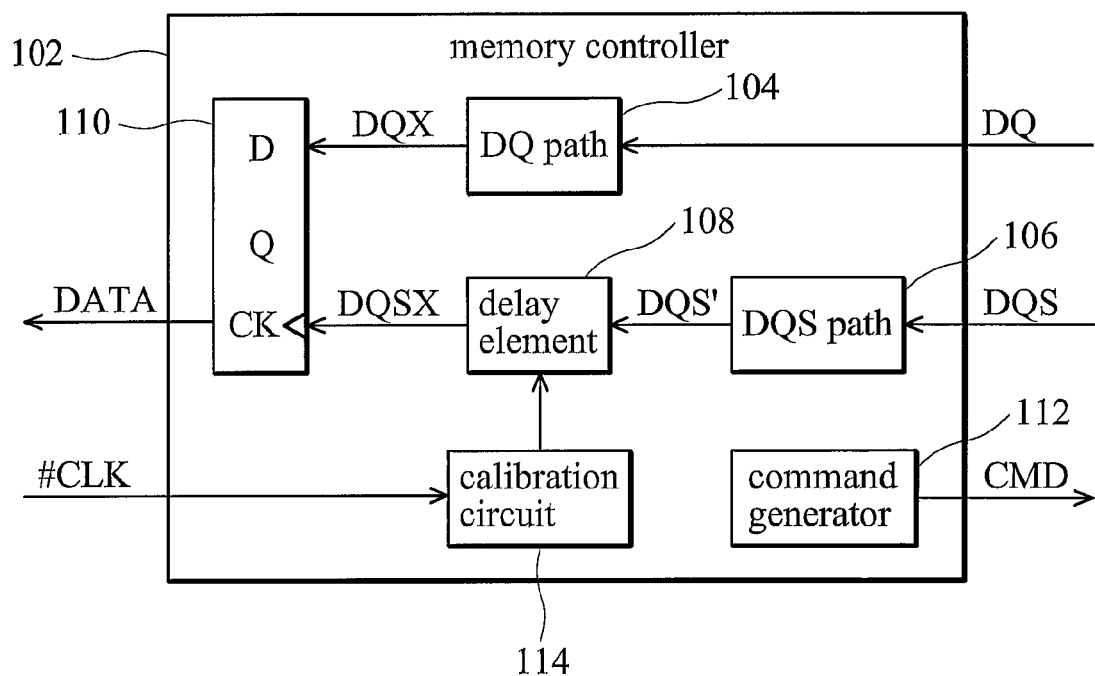
FIG. 1 shows a conventional memory controller transmitting data utilizing data signals DQ and DQS.
Figure 2A:
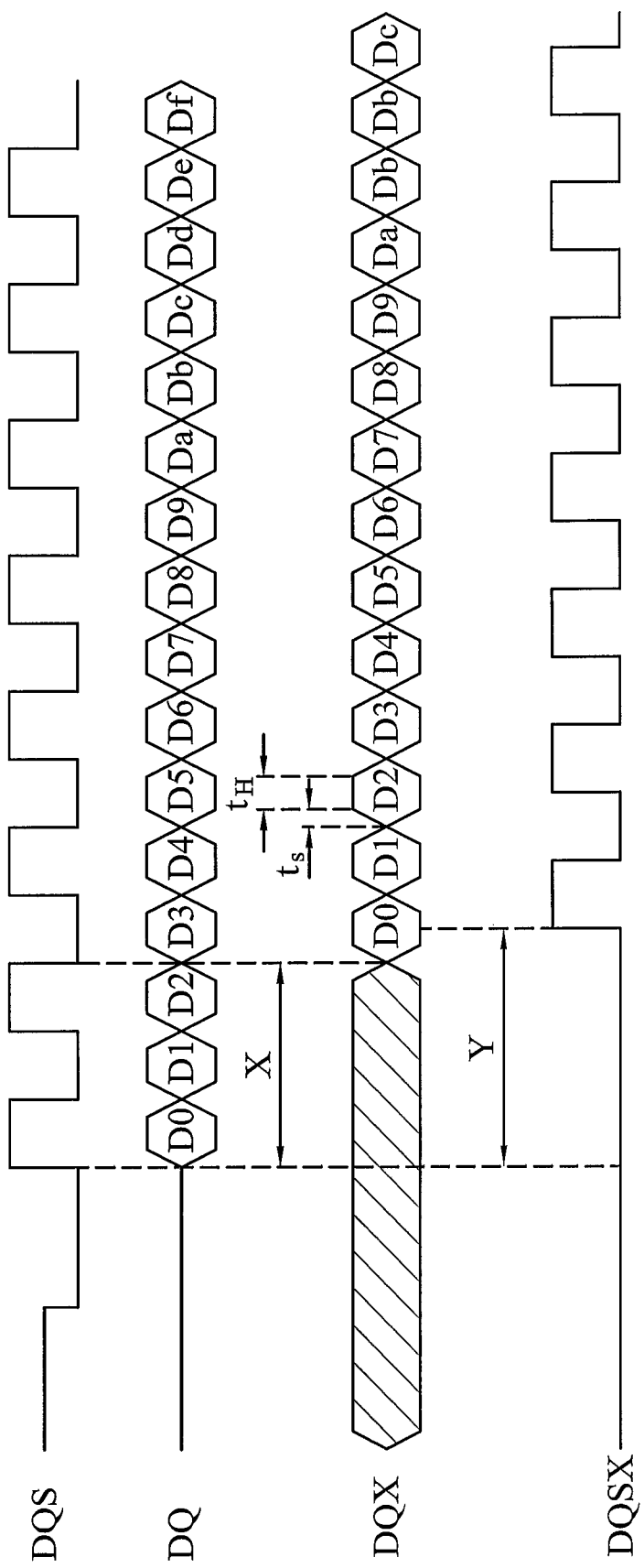
FIG. 2a is a timing chart of transmission latency induced in a memory controller.

The timing difference between the delayed data signal DQX and compensated data strobe signal DQSX, represented as Y-X in FIG. 2a, may have a range from a maximum value to a minimum value. Thereby the rising edge of the compensated data strobe signal DQSX falls within the range of the holding time $t_H$, allowing the delayed data signal DQX to be correctly sampled. The adjustment unit 202 adjusts the adjustment signal #DC by determining the maximum and minimum values. Specifically, the adjustment signal #DC is an average of the maximum and minimum values.

Figure 2B:
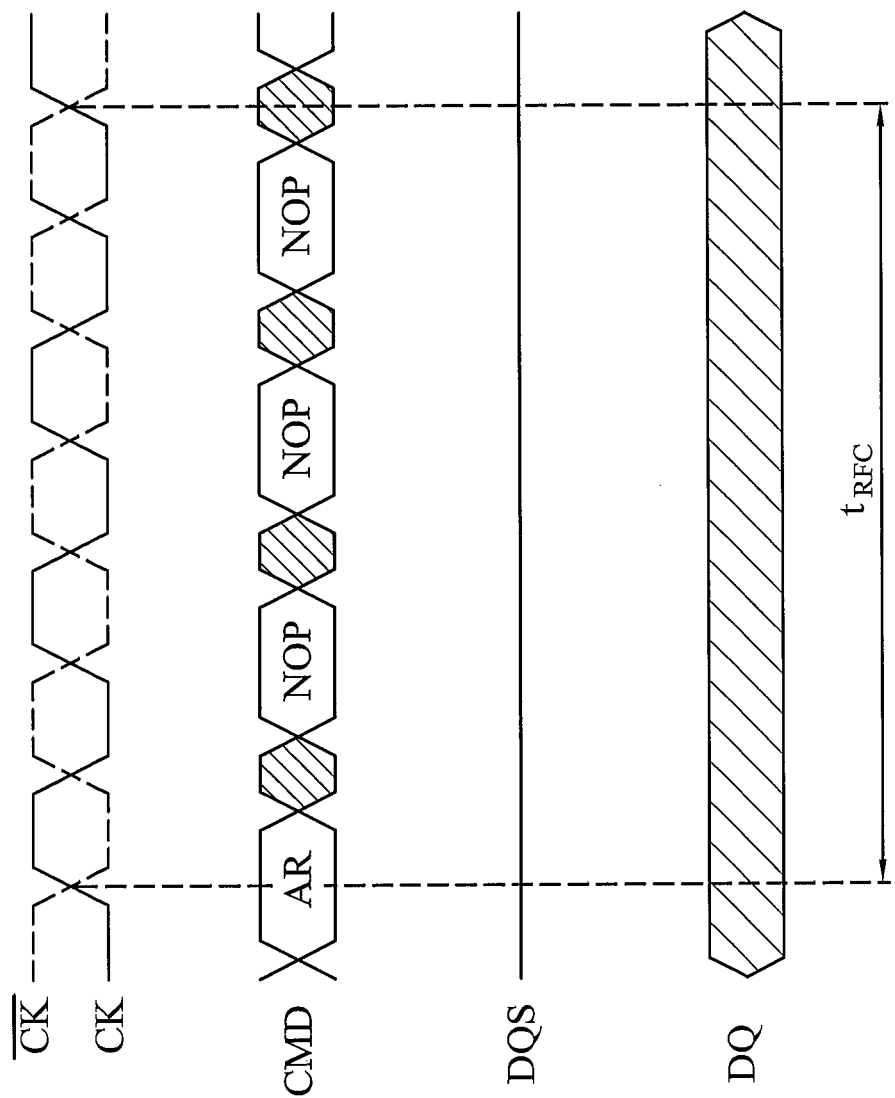
FIG. 2b is a timing chart of a conventional auto refresh cycle.

Since temperature and circuit characteristics vary with time, the memory controller 300 may require calibration periodically to compensate the latency errors, and the calibration may be triggered actively or passively. For example, the calibration may be triggered by the command generator 112 while an auto refresh operation is initialized. Conventionally, the auto refresh operation is initialized by the command generator 112 delivering a refresh command #AR to the memory device. As described in FIG. 2b, during the auto refresh operation, the data strobe signal DQS and data signal DQ are don't care signals. This embodiment utilizes the idle period to perform the calibration. In this case, the command generator 112 simultaneously performs the calibration when receiving the refresh command #AR from the command generator 112. In the calibration mode, a data strobe signal DQS and data signal DQ are input from a memory device (not shown), and the data signal DQ comprises a calibration pattern #CP. A trial compensated data strobe signal DQSX is generated by the delay element 108 based on a trial adjustment signal #DC, and the data signal DQ is sampled based on the trial compensated data strobe signal DQSX. By determining the correctness of the calibration pattern #CP in the DQ, the validity of the trail compensated data strobe signal DQSX and the corresponding adjustment signal #DC can be determined. Based on the determination, the adjustment signal #DC can be set to a proper value that assures the compensated data strobe signal DQSX rising edge to align within the hold time range of delayed data signal DQX, such that the data signal DQ can be sampled correctly. The adjustment unit 202 then sends the adjustment signal #DC to the delay element 108, and the delay element 108 delays the data strobe signal DQS with the desired latency to generate the compensated data strobe signal DQSX. The output data generated from flip flop 110 are fed back to the adjustment unit 202, and the correctness of the output data are determined by comparison with the calibration pattern #CP.

Alternatively, the calibration may be periodically initialized by the adjustment unit 202. The adjustment unit 202 delivers an enable signal #CE to the command generator 112, and in response, the command generator 112 sends an interrupt command to interrupt the memory device normal operation, and the calibration begins. In the calibration mode, a data signal DQ' comprising a calibration pattern #CP is generated and written to the memory device. The data signal DQ' is then read back from the memory device via the same data path as DQ, and a delayed data signal DQX is input to the flip flop 110. Simultaneously, the data strobe signal DQS is delayed by the DQS path 106, and the delay element 108 compensates the output from DQS path 106 to generate the compensated data strobe signal DQSX. For example, the adjustment unit 202 sends an adjustment signal #DC to the delay element 108, thus, the output of the DQS path 106 is delayed with corresponding latency to generate the compensated data strobe signal DQSX. The flip flop 110 then samples the delayed data signal DQX by the compensated data strobe signal DQSX, and the output data is fed back to the adjustment unit 202 for comparison with the calibration pattern #CP. If an error is found in the comparison, the adjustment signal #DC is deemed invalid and another trial #DC may be provided for another calibration.

Figure 4:
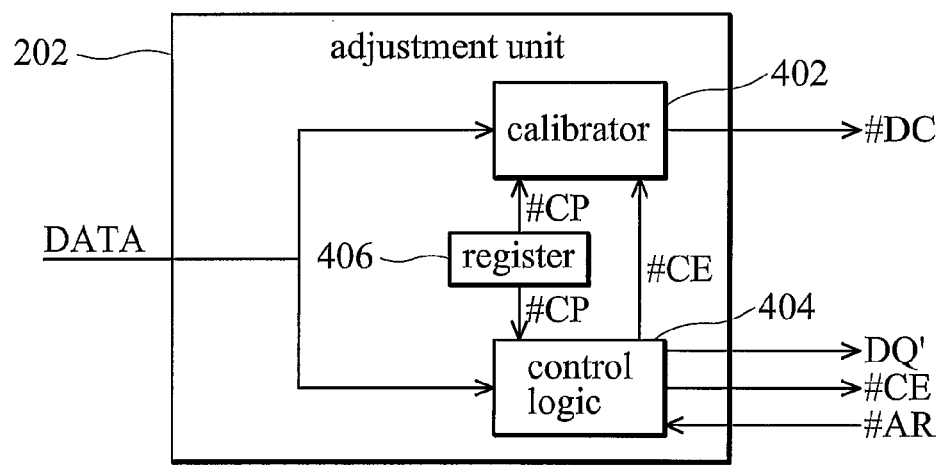
FIG. 4 shows an embodiment of an adjustment unit 202 in the FIG. 3.

FIG. 4 shows an embodiment of the adjustment unit 202 of FIG. 3. The adjustment unit 202 comprises a calibrator 402 and a control logic 404. The calibrator 402 provides the adjustment signal #DC to the delay element 108 to control the calibrated latency, and the control logic 404 delivers an enable signal #CE to enable the calibrator 402 when receiving a refresh command #AR from the command generator 112. The calibrator 402 compares the output data with the calibration pattern to adjust the adjustment signal #DC when enabled. The calibration pattern #CP may be provided by the memory device, and delivered as the data signal DQ to the flip flop 110 through the DQ path 104. Alternatively, the calibration pattern #CP may be generated by a register 406 in the adjustment unit 202 as the data signal DQ'. The calibration pattern #CP is programmed and written to the memory device before the calibration initiates, and is read from the memory device via the DQ path during the calibration.

In another embodiment, the control logic 404 initiates the calibration periodically by delivering an enable signal #CE. The calibrator 402 provides the adjustment signal #DC to the delay element 108 to control the latency difference between the delayed data signal DQX and compensated data strobe signal DQSX. The control logic 404 sends the enable signal #CE to the calibrator 402 and the command generator 112 to initialize the calibration. The register 406 provides the calibration pattern #CP to the calibrator 402 and the control logic 404. The control logic 404 also sends the calibration pattern #CP to the DQ path 104 as a data signal DQ' when the calibration is initialized, and the calibrator 402 compares the output from the flip flop 110 with the calibration pattern #CP to determine the validity of the adjustment signal #DC.

Figure 5:
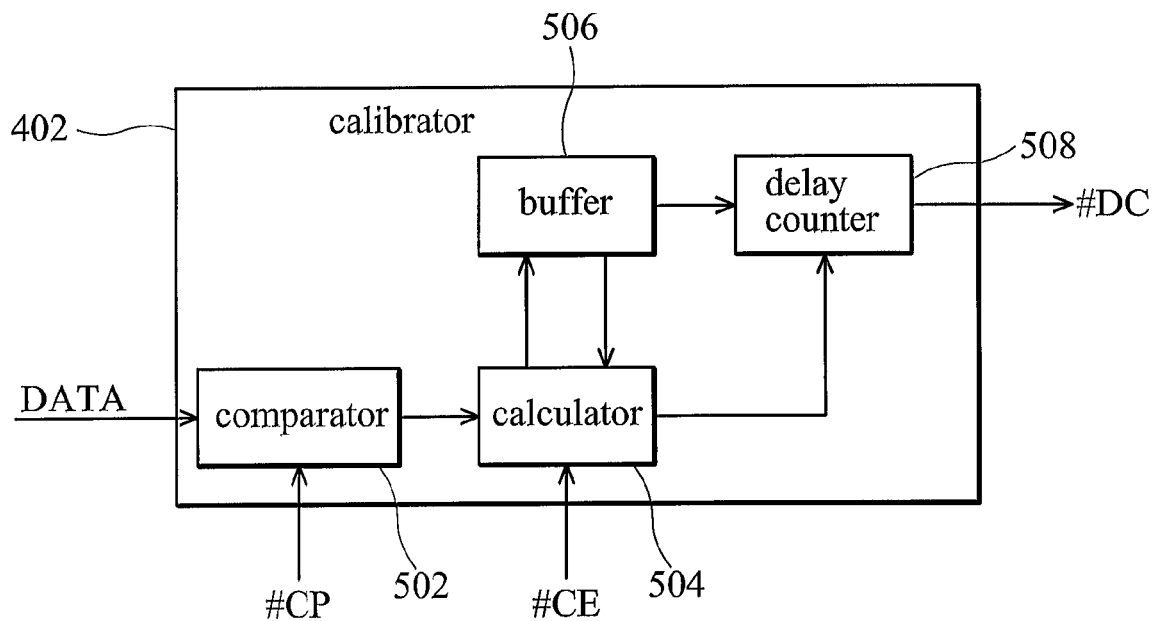
FIG. 5 shows an embodiment of a calibrator 402 of FIG. 4.

FIG. 5 shows an embodiment of a calibrator 402 in the FIG. 4. The calibrator 402 comprises a buffer 506, a delay counter 508, a comparator 502 and a calculator 504. The buffer 506 stores a maximum value and a minimum value representing compensated data strobe signal DQSX latency boundaries that samples delayed data signal DQX. The delay counter 508 is coupled to the buffer 506, generating the adjustment signal #DC corresponding to the maximum value or the minimum value. The compensated data strobe signal DQSX is generated by the delay element 108 based on the adjustment signal #DC, and an output data is generated in the flip flop 110 by sampling the delayed data signal DQX with the compensated data strobe signal DQSX. The comparator 502 compares the output data with the calibration pattern #CP. The calculator 504 is coupled to the buffer 506 and the comparator 502, when enabled by the enable signal #CE, determines whether the comparison result is valid, and accordingly updates the maximum value or the minimum value. When the calibration is finished, the adjustment signal #DC is set to an average of the updated maximum and minimum values, and the memory controller operates in the normal mode with the calibrated adjustment signal #DC.

Figure 6:
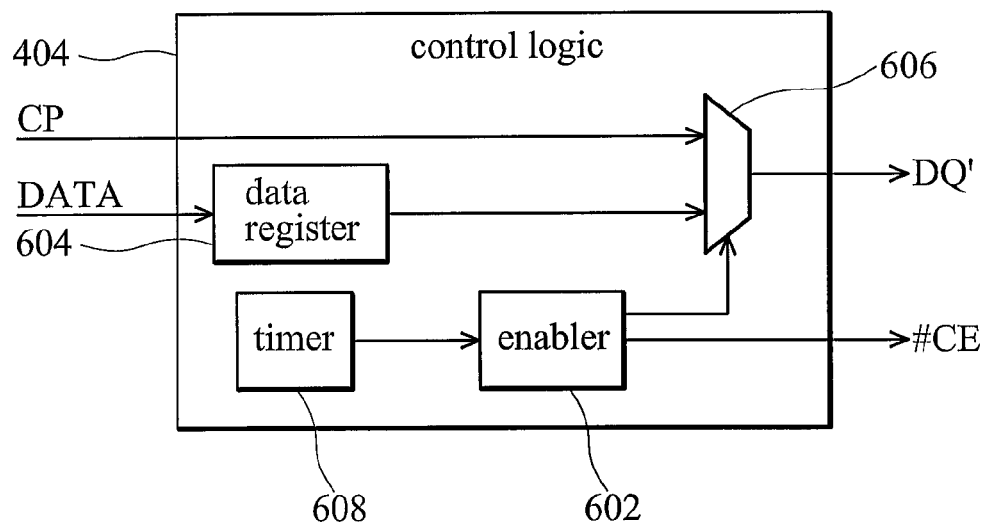
FIG. 6 shows an embodiment of control logic 404 of FIG. 4.

FIG. 6 shows an embodiment of a control logic 404 in the FIG. 4. The control logic 404 comprises a data register 604, a multiplexer 606, a timer 608 and an enabler 602. If the memory device is utilized to provide the calibration pattern #CP, a data register 604 is required to preserve data corresponding to a specific address in the memory device before writing the calibration pattern #CP to the memory device. The multiplexer 606, coupled to the data register 604, outputs the calibration pattern #CP as data signal DQ' to the DQ path 104 when in calibration mode, and outputs the preserved data to the memory device upon returning to normal operation. The timer 608 provides a trigger signal every predetermined period, such that the calibration is performed periodically to ensure sample quality. The enabler 602 is coupled to the multiplexer 606 and the timer 608, generating the enable signal #CE to initialize the calibration upon receiving the trigger signal.

Figure 7:
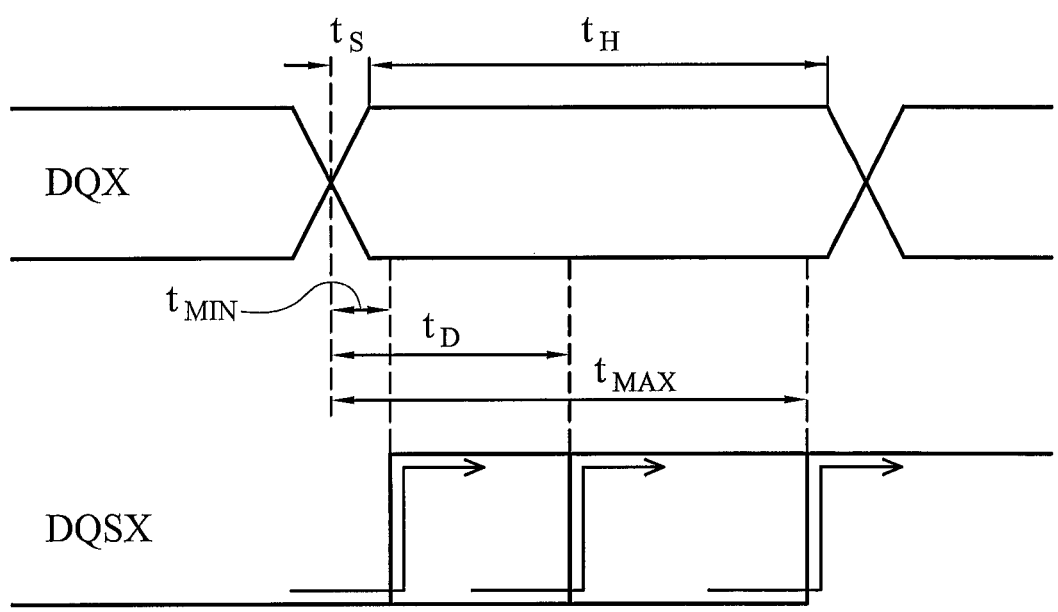
FIG. 7 is a timing chart of delayed data signal DQX and compensated data strobe signal DQSX.

FIG. 7 is a timing chart of delayed data signal DQX and compensated data strobe signal DQSX. The rising edge of the compensated data strobe signal DQSX is utilized to sample the delayed data signal DQX. Since the delayed data signal DQX comprises a setup time and a hold time period, and only the hold time period is available for sampling, thus, the proper timing to sample the delayed data signal DQX ranges from a minimum value $t_{MIN}$ to a maximum value $t_{MAX}$. The minimum value $t_{MIN}$ and the maximum value $t_{MAX}$, however, may vary when the DQ path 104 and DQS path 106 are influenced by temperature, therefore the calibration is performed periodically to detect the $t_{MAX}$ and $t_{MIN}$, and an average value $t_D$ is setup for the compensated data strobe signal DQSX to sample the delayed data signal DQX. In this way, the sampling is kept in a safe range that guarantees data correctness.

Figure 8:
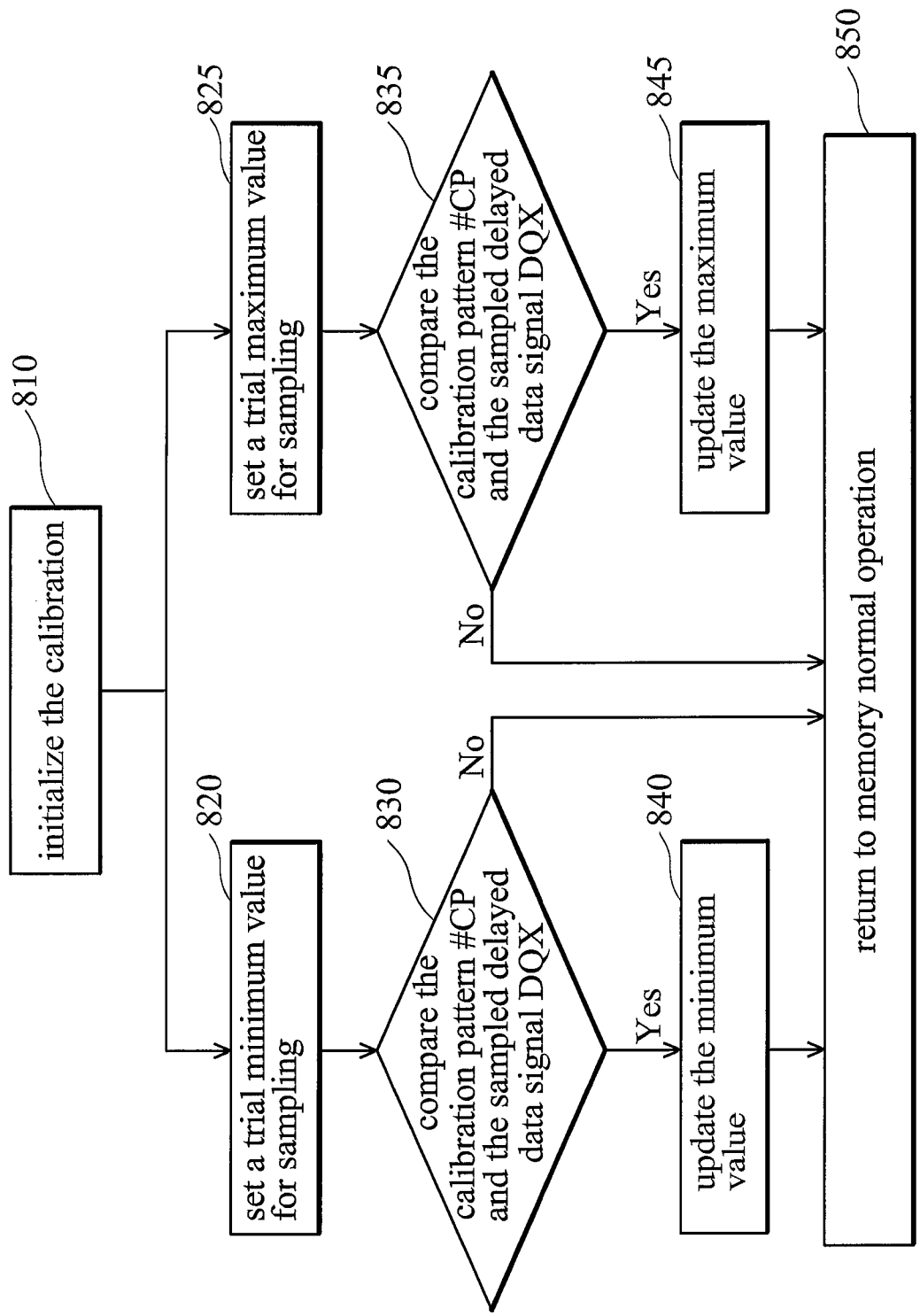
FIG. 8 is a flowchart of the data strobe calibration method.

FIG. 8 is a flowchart of the data strobe calibration method. In step 810, the calibration is initialized. The calibration may be initialized simultaneously with the memory auto refresh operation, making use of the idle DQ and DQS paths. Alternatively, the calibration may be periodically initialized by the memory controller, and when initialized, the memory normal operation is interrupted temporarily. After step 810, step 820 and 825 are proceeded alternatively. In step 820, a trial minimum value is set for sampling. The trial minimum value is the current minimum value minus an offset, and a compensated data strobe signal DQSX of corresponding latency is generated to sample a delayed data signal DQX comprising a calibration pattern #CP. In step 830, the calibration pattern #CP and the sampled delayed data signal DQX are compared to determine whether the trial minimum value is within the workable range. IF yes, the trial minimum value is stored in step 840. If not, the process proceeds to step 850, returning to memory normal operation. Similarly, in step 825, a trial maximum value is set for sampling, and the trial maximum value is the current maximum value plus an offset. A compensated data strobe signal DQSX of corresponding latency is generated to sample the delayed data signal DQX comprising a calibration pattern #CP. In step 835, the calibration pattern #CP and the sampled delayed data signal DQX are compared to determine whether the new maximum value is within a workable range. If yes, the trial maximum value is stored in step 845, else step 850 is processed, returning to memory normal operation. The calibration pattern #CP may be a programmable data stream provided by the memory controller, and input to the DQS path 106 directly. In other cases, the calibration pattern #CP can be previously written to the memory device, and read as the data signal DQ when calibrated.

Figure 9:
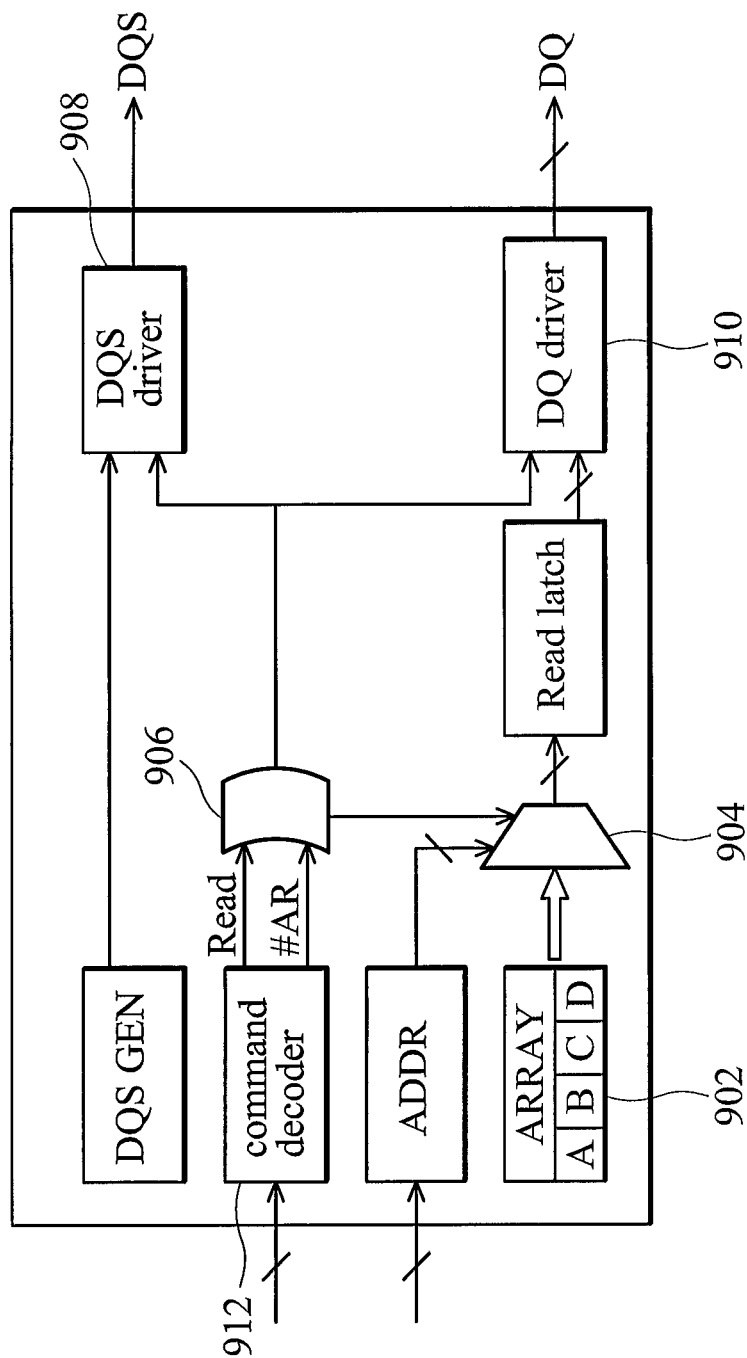
FIG. 9 shows an embodiment of a memory device supporting data strobe calibration.

FIG. 9 shows an embodiment of a memory device supporting data strobe calibration. The memory device comprises a command decoder 912, an or-gate 906, a memory array 902, a DQS driver 908, a multiplexer 904 and a DQ driver 910, performing calibration by receiving an auto refresh command. During a conventional auto refresh operation, the DQS driver 908 and DQ driver 910 are idle. In this embodiment, the DQS driver 908 and DQ driver 910 are utilized to deliver calibration pattern #CP when auto-refreshing. When the command decoder 912 receives a refresh command #AR, the calibration mode is enabled. The or-gate 906 is coupled to the command decoder 912, activating the DQS driver 908 and DQ driver 910 based on the received refresh command #AR. The memory array 902 stores a calibration pattern #CP. The DQS driver 908 is coupled to the or-gate 906, generating a data strobe signal DQS when activated. The multiplexer 904, coupled to the memory array 902, outputs the calibration pattern #CP from the memory array 902 in response to the refresh command #AR. The DQ driver 910 is coupled to the multiplexer 904 and the or-gate 906, generating a calibration pattern #CP as a data signal DQ and outputting to the memory controller for calibration.

Figure 10:
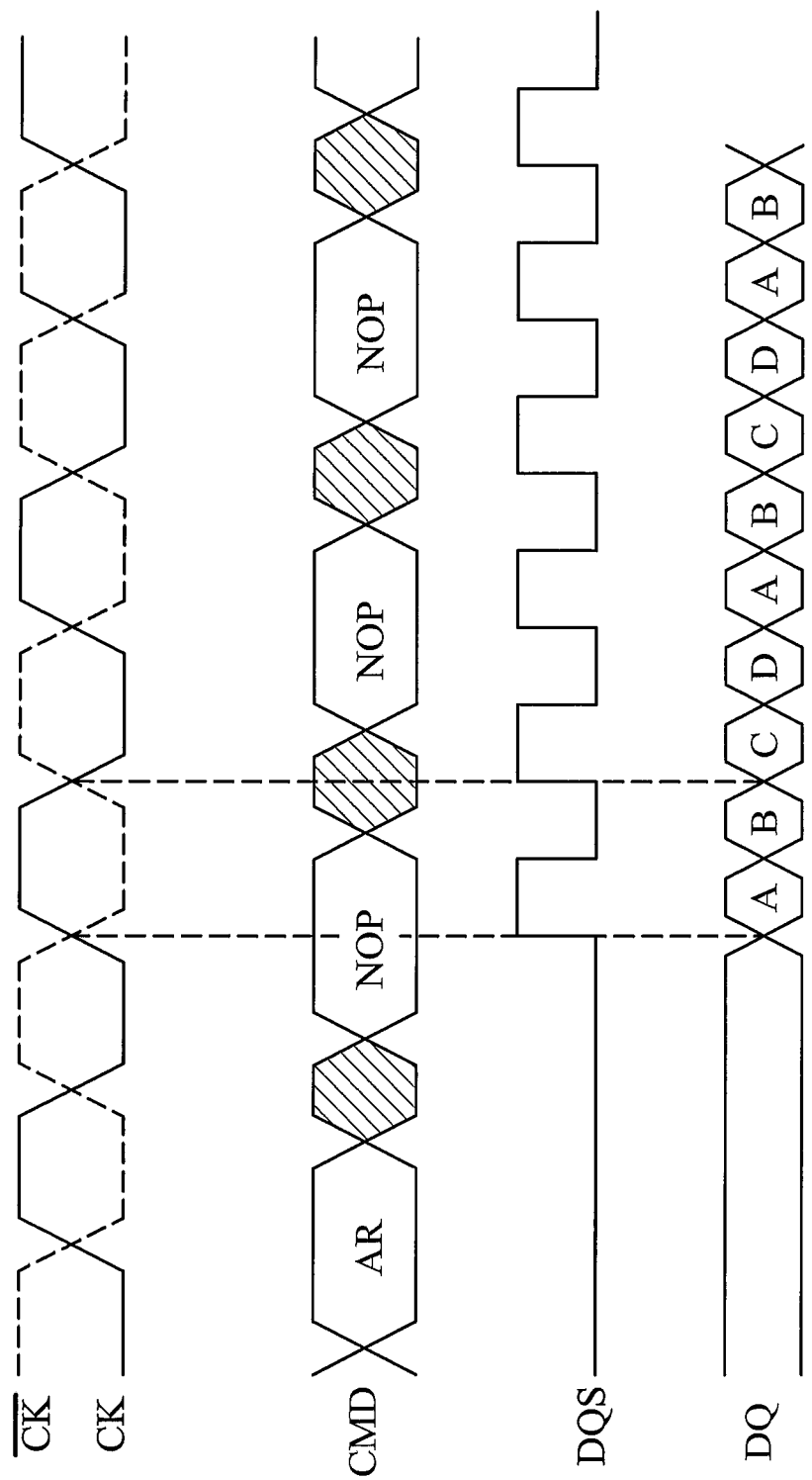
FIG. 10 is a timing chart of a modified auto refresh cycle.

FIG. 10 is a timing chart of a modified auto refresh cycle. During the auto refresh operation, the memory device delivers a calibration pattern #CP as the DQ, and a data strobe signal DQS simultaneously to the memory controller.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory controlling method, comprising:
receiving and passing a data signal via a DQ path for outputting a delayed data signal;
receiving and passing a data strobe signal via a DQS path;
generating a compensated data strobe signal having a calibrated latency from the data strobe signal, wherein the calibrated latency is determined by an adjustment signal;
sampling the delayed data signal by the compensated data strobe signal to generate an output data;
generating the adjustment signal according to the output data;
performing a calibration to adjust the adjustment signal for adjusting the calibrated latency.

2. The memory controlling method of claim 1, wherein the adjustment signal is adjusted by determining a maximum and a minimum value of the calibrated latency that allows the delayed data signal to be sampled correctly and the calibrated latency is generated by receiving the adjustment signal, the calibrated latency corresponding to an average of the maximum and minimum values.

3. The memory controlling method of claim 1, further comprising:
initializing the calibration by delivering a refresh command, wherein:
when the refresh command is delivered, a calibration mode is initialized synchronously with an auto refresh operation;
in the calibration mode:
the data signal and data strobe signal are input, wherein the data signal comprises a calibration pattern;
sending an adjustment signal for delaying the data strobe signal for a calibrated latency to generate a compensated data strobe signal;
sampling the delayed data signal based on the compensated data strobe signal for generating the output data; and
adjusting the adjustment signal based on the output data and the calibration pattern.

4. The memory controlling method of claim 3, further comprising:
providing the adjustment signal for controlling the calibrated latency; and
initializing the calibration by delivering an enable signal to enabling the step of controlling the calibrated latency; and
comparing the output data with the calibration pattern to adjust the adjustment signal when the enable signal is delivered.

5. The memory controlling method of claim 1, further comprising:
delivering commands to control a memory device, wherein:
initializing the calibration by delivering an enable signal;
initializing a calibration mode when the enable signal is delivered;
sending an interrupt command to interrupt the memory device when the enable signal is delivered;
in the calibration mode:
generating a calibration pattern as a data signal;
delaying the data signal to generate a delayed data signal;
sending an adjustment signal to delay the data strobe signal so that a compensated data strobe signal having a calibrated latency;
sampling the delayed data signal based on the compensated data strobe signal for generating the output data; and
adjusting the adjustment signal according to the output data and the calibration pattern.

6. The memory controlling method of claim 5, further comprising:
providing the adjustment signal to control the latency difference between the delayed data signal and the compensated data strobe signal;
sending an enable signal to initializing the calibration;
providing the calibration pattern wherein:
sending the calibration pattern as a data signal when the calibration is initialized; and
comparing the output data with the calibration pattern to determine the validity of the adjustment signal.

7. The memory controlling method of claim 5, further comprising:
providing the adjustment signal to control the calibrated latency;
sending an enable signal to initialize the calibration; and
providing the calibration pattern, wherein:
issuing a write command to the memory device when the calibration is initialized;
writing the calibration pattern as a data signal to the memory device;
issuing a read command to read the data signal and the data strobe signal from the memory device; and
comparing the output data with the calibration pattern to determine the validity of the adjustment signal.

8. The memory controlling method of claim 7, further comprising:
storing a maximum value and a minimum value;
generating the adjustment signal from the maximum value or the minimum value;
comparing the output data with the calibration patter; and
determine whether the output data matches the calibration patter when receiving the enable signal; and
updating the maximum value or the minimum value when the calibration; wherein when the calibration is finished, the adjustment signal is set to an average of the maximum and minimum values.

9. The memory controlling method of claim 7, further comprising:
preserving data corresponding to a specific address in the memory device before writing the data signal comprising the calibration pattern to the memory device;
multiplexing the calibration pattern and the preserved data;
providing a trigger signal every predetermined period;
generating the enable signal to initialize the calibration when receiving the trigger signal; wherein:
in the calibration mode, outputting the calibration pattern as the data signal; and
when the calibration is finished, restoring the preserved data to the memory device.

* * * * *